United States Patent
Shimai et al.

(10) Patent No.: US 12,307,313 B2
(45) Date of Patent: May 20, 2025

(54) IC TAG

(71) Applicant: NITTA CORPORATION, Osaka (JP)

(72) Inventors: Toshiharu Shimai, Yamatokooriyama (JP); Hirofumi Tsujimoto, Yamatokooriyama (JP)

(73) Assignee: NITTA CORPORATION, Osaka (JP)

( * ) Notice: Subject to any disclaimer, the term of this patent is extended or adjusted under 35 U.S.C. 154(b) by 896 days.

(21) Appl. No.: 16/959,840

(22) PCT Filed: Dec. 27, 2018

(86) PCT No.: PCT/JP2018/048003
§ 371 (c)(1),
(2) Date: Jul. 2, 2020

(87) PCT Pub. No.: WO2019/135381
PCT Pub. Date: Jul. 11, 2019

(65) Prior Publication Data
US 2020/0372314 A1     Nov. 26, 2020

(30) Foreign Application Priority Data
Jan. 5, 2018   (JP) ................. 2018-000866

(51) Int. Cl.
*G06K 19/07*   (2006.01)
*G06K 19/02*   (2006.01)
(Continued)

(52) U.S. Cl.
CPC ........... *G06K 19/077* (2013.01); *G06K 19/02* (2013.01); *H01Q 1/40* (2013.01)

(58) Field of Classification Search
CPC ......... G06K 19/077; G06K 19/02; H01Q 1/40
(Continued)

(56) References Cited

U.S. PATENT DOCUMENTS

2004/0174257 A1*  9/2004  Kuhns ................. G06K 19/02
                                                       428/209
2006/0208900 A1   9/2006  Tavassoli Hozouri
(Continued)

FOREIGN PATENT DOCUMENTS

CN      101053115 A      10/2007
CN      107358291 A      11/2017
(Continued)

OTHER PUBLICATIONS

Extended European Application No. 18898329.0, dated Aug. 17, 2021.
(Continued)

*Primary Examiner* — Hung S. Bui
(74) *Attorney, Agent, or Firm* — Birch, Stewart, Kolasch & Birch, LLP

(57) ABSTRACT

An IC tag according to the present invention includes: an IC chip (2); a dipole antenna (3) for electrically transmitting and receiving information stored in the IC chip (2); and a sheet-shaped substrate (1) that supports the IC chip (2) and the dipole antenna (3). In this IC tag, 0.1≤R/L≤2.5 is satisfied, where R is a resistance value between two ends (S1, S2) of the dipole antenna (3) and L is a length of a path that connects the two ends (S1, S2) of the dipole antenna (3) while extending along the dipole antenna (3) without passing through the IC chip (2).

7 Claims, 3 Drawing Sheets

(51) Int. Cl.
  *G06K 19/077* (2006.01)
  *H01Q 1/40* (2006.01)
(58) Field of Classification Search
  USPC .......................................................... 361/737
  See application file for complete search history.

(56) References Cited

U.S. PATENT DOCUMENTS

| | | | |
|---|---|---|---|
| 2007/0200711 | A1 | 8/2007 | Kai et al. |
| 2008/0036609 | A1* | 2/2008 | Baba ................ G06K 19/07749 340/572.7 |
| 2008/0088460 | A1 | 4/2008 | Copeland |
| 2008/0143535 | A1 | 6/2008 | Fischer |
| 2009/0164954 | A1 | 6/2009 | Yamagajo et al. |
| 2010/0097191 | A1 | 4/2010 | Yamagajo et al. |
| 2010/0283694 | A1 | 11/2010 | Kato |
| 2012/0153029 | A1* | 6/2012 | Kato ........................ H01Q 9/26 343/741 |

FOREIGN PATENT DOCUMENTS

| | | |
|---|---|---|
| JP | 2006-197440 A | 7/2006 |
| JP | 2015-8444 A | 1/2015 |
| JP | 2018-33748 A | 3/2016 |

OTHER PUBLICATIONS

International Search Report (PCT/ISA/210) issued in PCT/JP2018/046003 mailed on Feb. 19, 2019.
Written Opinion (PCT/ISA/237) issued in PCT/JP2018/048003 mailed on Feb. 19, 2019.
Chinese Office Action and Search Report for Chinese Application No. 201880085199.9, dated Jan. 13, 2023, with an English translation.
European Communication pursuant to Article 94(3) EPC for European Application No. 18898329.0, dated Mar. 30, 2023.
Indian Office Action for Indian Application No. 202017032075, dated Mar. 29, 2022, with English translation.
Korean Office Action for Korean Application No. 10-2020-7018948, dated Mar. 7, 2024, with English translation.
Canadian Office Action for Canadian Application No. 3,087,661, dated Mar. 22, 2024.
Korean Office Action for Korean Application No. 10-2020-7018948, dated Jul. 26, 2024, with English translation.
Kim et al., "UHF RFID Dipole Tag Antenna Design Using Flexible Electro-Thread," Journal of Korean Institute of Electromagnetic Engineering and Science, Jan. 2008, pp. 1-12, with English translation.
Korean Office Action for Korean Application No. 10-2020-7018948, dated Mar. 6, 2025, with English translation.

* cited by examiner

IC TAG

TECHNICAL FIELD

The present invention relates to an IC tag.

BACKGROUND ART

In recent years, a type of IC tag called an "inlet" has been proposed, in which an antenna pattern for radio frequency communication and an IC chip are mounted on a base sheet made of plastic or paper. Such inlets are used for the management of articles in a state of being sealed with resin and then attached to or embedded in the articles.

The above-described IC tags may be attached to linen articles for management of the linen articles, but it is common practice to use a metal detector to inspect the linen articles for the presence of metal contaminants at the time of shipment. However, the IC tags have an antenna pattern formed of metal, and thus, when a metal detector is used to inspect the linen articles having the IC tags attached thereto, the metal detector detects the IC tags as metal even if no metal contaminants are present in the linen articles. This poses a problem in that the inspection for actual metal contaminants cannot be performed smoothly.

To address this problem, Patent Literature 1 discloses an IC tag in which the resistance value of an antenna is set to 50 to 1000Ω, and also discloses that the IC tag with an antenna resistance value in such a range does not respond to a metal detector.

CITATION LIST

Patent Literature

Patent Literature 1: JP 2016-33748A

SUMMARY OF INVENTION

Technical Problem

However, even the IC tag of Patent Literature 1 may be detected by a metal detector, and further improvement thus has been demanded. The present invention is intended to solve the above-described problem, and it is an object of the present invention to provide an IC tag that can be more reliably prevented from being detected by a metal detector.

Solution to Problem

The IC tag according to the present invention is an IC tag including: an IC chip; a dipole antenna for electrically transmitting and receiving information stored in the IC chip; and a sheet-shaped substrate that supports the IC chip and the dipole antenna, wherein $0.1 \leq R/L \leq 2.5$ is satisfied, where R is a resistance value between two ends of the dipole antenna and L is a length of a path that connects the two ends of the dipole antenna while extending along the dipole antenna without passing through the IC chip.

In the above-described IC tag, the length L may be not less than 120 mm and not more than 200 mm.

In the above-described IC tag, the material of the dipole antenna may contain any one of silver, aluminum, and copper.

The above-described IC tag may further include: a sheet-shaped cover that covers the IC chip and the antenna, the IC chip and the antenna being disposed between the cover and the substrate; and a pressure-sensitive adhesive that bonds the cover and the substrate.

Advantageous Effects of Invention

According to the present invention, it is possible to more reliably prevent an IC tag from being detected by a metal detector.

DESCRIPTION OF EMBODIMENTS

1. Overview of IC Tag

Figure 1:
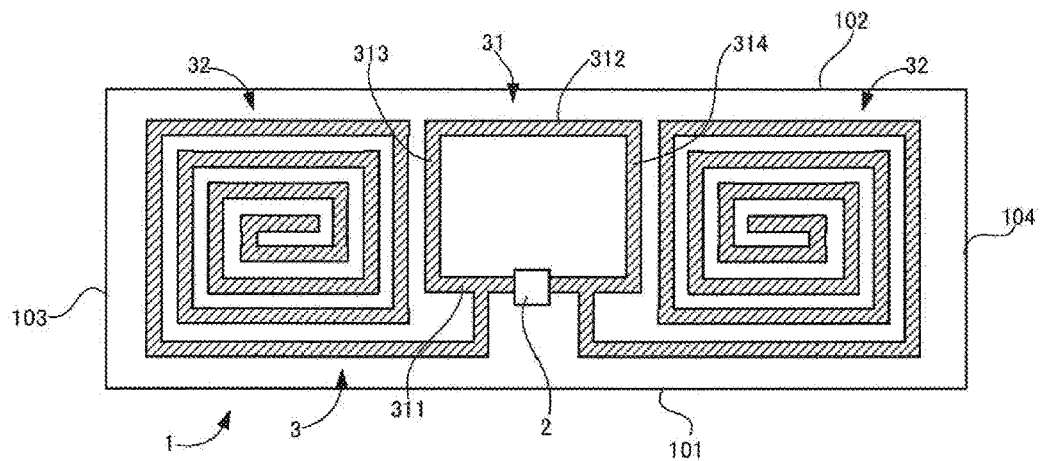
FIG. 1 is a plan view showing an embodiment of an IC tag according to the present invention.
Figure 2:
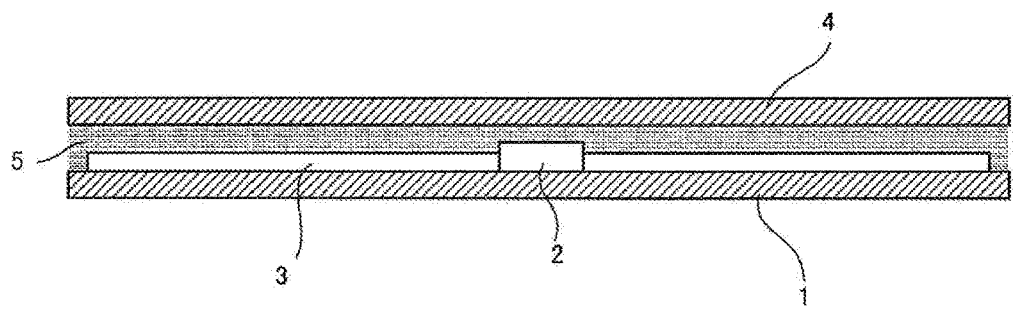
FIG. 2 is a cross-sectional view of the IC tag shown in FIG. 1.

An embodiment of an IC tag according to the present invention will be described below with reference to the drawings. FIG. 1 is a plan view of the IC tag according to the present embodiment, and FIG. 2 is a cross-sectional view of FIG. 1. FIG. 1 does not show a cover for the sake of convenience of illustration. As shown in FIGS. 1 and 2, the IC tag according to the present embodiment includes a sheet-shaped substrate 1 formed in a rectangular shape, an IC chip 2 and a dipole antenna 3 disposed on this substrate 1, and a sheet-shaped cover 4 that is formed in a rectangular shape and covers the IC chip 2 and the dipole antenna 3. The substrate 1 and the cover 4 are bonded together using a pressure-sensitive adhesive 5. Each of these members will be described in detail below.

The substrate 1 and the cover 4 are formed in the same shape, and the pressure-sensitive adhesive 5 is disposed so as to completely fill the gap between the substrate 1 and the cover 4. That is, the pressure-sensitive adhesive 5 covers the IC chip 2 and the dipole antenna 3 in such a manner that the IC chip 2 and the dipole antenna 3 are not exposed from the gap between the substrate 1 and the cover 4.

The materials of the substrate 1 and the cover 4 are not particularly limited, and, for example, may be formed using polyethylene, polypropylene, polyethylene terephthalate, polyvinyl chloride, or the like. The thicknesses of the substrate 1 and the cover 4 are, for example, preferably 25 to 200 μm and more preferably 25 to 100 μm.

Hereinafter, as shown in FIG. 1, sides of the substrate 1 and the cover 4 in the lengthwise direction are referred to as a first side 101 and a second side 102, and sides of the same in the widthwise direction are referred to as a third side 103 and a fourth side 104, for the sake of convenience of explanation. Accordingly, these sides are connected to each other in the order of the first side 101, the third side 103, the second side 102, and the fourth side 104.

The IC chip 2 is a known IC chip having a memory function, and is electrically connected to the dipole antenna 3 formed of a conductor.

In the present embodiment, a dipole antenna as shown in FIG. 1 is used as an illustrative example. Specifically, this dipole antenna 3 includes an impedance matching portion 31 disposed in the vicinity of the center of the substrate 1 in the lengthwise direction, and a pair of dipole portions 32 extending from the impedance matching portion 31 in the lengthwise direction of the substrate 1. The impedance matching portion 31 is formed in the shape of a rectangular frame having first to fourth sides. More specifically, a first side 311 of the impedance matching portion 31 is disposed somewhat spaced apart from the first side 101 of the substrate 1, and a second side 312 is disposed along the second side 102 of the substrate 1. That is, in the impedance matching portion 31, the first side 311, a third side 313, the second side 312, and a fourth side 314 are connected to each other in this order. The IC chip 2 is disposed in the vicinity of the center of the first side 311 of the impedance matching portion 31.

Since the dipole portions 32 have shapes symmetrical to each other, only one of them will be described. The dipole portion 32 extends from the first side 311 of the impedance matching portion 31 toward the first side 101 of the substrate 1, then extends along the first side 101, the third side 103, and the second side 102 of the substrate 1, and further extends along the third side 313 of the impedance matching portion 31, thereby forming a rectangular frame. Thereafter, the dipole portion 32 extends spirally inside the frame.

The material of the dipole antenna 3 is not particularly limited, and the dipole antenna 3 can be made of, for example, silver, copper, or aluminum. When silver is used, the dipole antenna 3 can be formed by applying a silver paste containing silver onto the substrate 1 through screen printing. On the other hand, when copper or aluminum is used, the dipole antenna 3 can be formed through etching. The IC chip 2 can be fixed to the antenna 3 using, for example, a known flip-chip mounting procedure for electronic components.

The above-described dipole antenna 3 enables transmission and reception of information stored in the IC chip 2 using, for example, radio waves in the UHF band.

The pressure-sensitive adhesive 5 may be, for example, a rubber-based pressure-sensitive adhesive containing natural rubber or synthetic rubber as a main component. The thickness of the rubber-based pressure-sensitive adhesive 5 is not particularly limited, and is preferably 28 to 500 μm and more preferably 28 to 72 μm. Examples of the synthetic rubber to be used in the rubber-based pressure-sensitive adhesive 5 include, but not particularly limited to, styrene-isoprene-styrene block copolymers, styrene-butadiene-styrene block copolymers, hydrogenated products of the above-described styrene-based block copolymers, styrene-butadiene rubber (SBR), polyisoprene rubber (IR), polyisobutylene (PIB), and butyl rubber (IIR).

The rubber-based pressure-sensitive adhesive 5 may further contain a tackifier, in addition to the above-described natural rubber or synthetic rubber. Examples of the tackifier include terpene phenol resins, rosin resins, and petroleum resins. The amount of resin to be used as the tackifier can be selected as appropriate within a range where the pressure-sensitive adhesion performance is not impaired. In addition to the above-described components, the rubber-based pressure-sensitive adhesive may optionally contain additives such as a softener, a plasticizer, a filler, an anti-aging agent, and a coloring agent as necessary.

As the pressure-sensitive adhesive 5, not only the rubber-based pressure-sensitive adhesive but also an acrylic pressure-sensitive adhesive or a silicone pressure-sensitive adhesive can be used.

2. Physical and Electrical Properties of Dipole Antenna

Figure 3:
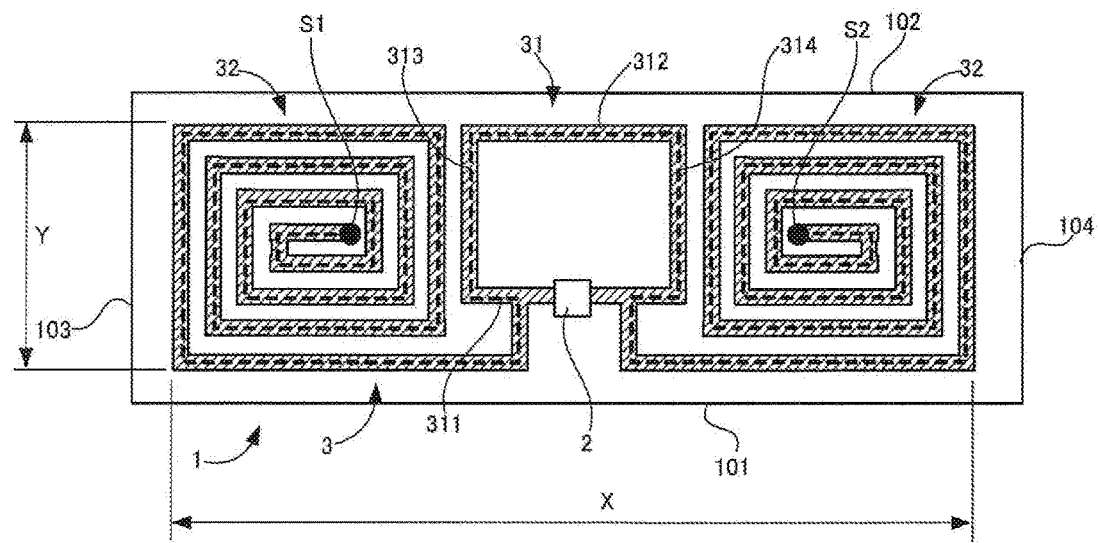
FIG. 3 is a plan view for illustrating an antenna of the IC tag shown in FIG. 1.

The dipole antenna 3 according to the present embodiment has the following physical and electrical properties. The physical and electrical properties will be described with reference to FIG. 3. First, as shown in FIG. 3, the resistance value between two ends S1 and S2 of the dipole antenna 3 is defined as R (Ω), and the length of a path that connects the two ends S1 and S2 of the dipole antenna 3 while extending along the dipole antenna 3 without passing through the IC chip 2 (hereinafter, this path is referred to as "antenna path": indicated with the broken line in FIG. 3) is defined as L (cm). The dipole antenna 3 according to the present embodiment satisfies the following formula (1). The antenna path passes through the center of the line width of the dipole antenna 1.

$$0.1 \leq R/L \leq 2.5 \tag{1}$$

This defines the resistance per unit length of the antenna path. When R/L is 0.1 or more, it becomes difficult for a current to flow, whereby the IC tag is prevented from being detected by a metal detector. On the other hand, when R/L is greater than 2.5, the communication range is reduced, whereby application software to which the IC tag is applicable may be limited. Accordingly, R/L is preferably 2.5 or less. In order to more reliably prevent the IC tag from being detected by a metal detector, it is more preferable that R/L satisfies the following formula (2).

$$1.5 \leq R/L \leq 2.5 \tag{2}$$

The resistance value R (Ω) between the two ends S1 and S2 of the antenna 3 is not particularly limited, and is, for example, preferably 10 to 50Ω and more preferably 20 to 44Ω. This is because, when the resistance value R is 10Ω or more, it becomes difficult for a current to flow, and when the resistance value R is 50Ω or less, the communication range is broad enough to stabilize communication.

Also, the length L of the above-described antenna path is not particularly limited, and is, for example, preferably 120 to 200 mm and more preferably 130 to 180 mm. This is because, when the length L of the antenna path is short, the communication becomes unstable, and when the antenna path is too long, the IC tag is more likely to be detected by a metal detector.

The size of the outer shape of the dipole antenna 3 is not particularly limited. In order to prevent the IC tag from being detected by a metal detector, the length X of the outer shape of the dipole antenna 3 in the lengthwise direction is, for example, preferably 60 mm or less and more preferably 40 mm or less. The length Y of the outer shape of the dipole antenna 3 in the widthwise direction is preferably 20 mm or less and more preferably 10 mm or less. Accordingly, the area (X×Y) of the outer shape of the dipole antenna is preferably 1200 mm² and more preferably 400 mm² or less.

The thickness of the dipole antenna 3 is not particularly limited, and is, for example, preferably 20 μm or less, more preferably 15 μm or less, and particularly preferably 10 μm or less. For example, when the dipole antenna 3 is formed through printing the above-described silver paste, the thickness of the dipole antenna 3 can be adjusted more easily as compared with the case where the dipole antenna 3 is formed using copper or aluminum through etching, and the thickness of the dipole antenna 3 can be set to 10 μm or less. Accordingly, the IC tag can be more reliably prevented from being detected by a metal detector.

3. Metal Detector

A metal detector by which the IC tag according to the present embodiment should not be detected may be, for example, a metal detector for detecting nonferrous metals. This is because, as described above, there are cases where the dipole antenna is formed of a nonferrous metal such as silver, copper, or aluminum. The detection sensitivity is preferably such that the IC tag is not detected when, for example, MUK-500 manufactured by NIKKA DENSOK LIMITED is used as a metal detector. This device has a detection sensitivity capable of detecting, as the smallest substance it can detect, a ball made of SUS having an outer diameter of 1.5 mm or more. Therefore, as an example of the metal detector by which the IC tag according to the present embodiment is not detected, a metal detector having the above-described detection sensitivity for nonferrous metals can be defined. It is to be noted, however, that such a metal detector is merely an illustrative example, and the present invention may be embodied based on the assumption that the metal detector is a metal detector for detecting iron.

4. Characteristics

As described above, the IC tag according to the present embodiment in which the dipole antenna 3 is configured to satisfy the above formula (1) can be prevented from being detected by a metal detector.

5. Modifications

Although one embodiment of the present invention has been described above, the present invention is not limited to the above embodiment, and various changes can be made thereto without departing from the gist of the invention. Moreover, a plurality of modifications to be described below can be combined as appropriate.

5-1

The shape of the above-described dipole antenna 3 is merely an illustrative example, and various shapes can be adopted as long as the above formula (1) is satisfied. Moreover, the shape of the IC tag, i.e., the shapes of the substrate 1 and the cover 4 are also not particularly limited. In addition to an elongated shape such as described above, the IC tag may have various shapes including a rectangular shape, a circular shape, and a polygonal shape according to its use. Further, the substrate 1 and the cover 4 need not have the same shape.

5-2

In the above embodiment, the pressure-sensitive adhesive 5 is applied so as to completely fill the gap between the substrate 1 and the cover 4. However, the present invention is not limited thereto. For example, the rubber-based pressure-sensitive adhesive 5 may be applied only to a peripheral edge portion of the substrate 1 and the cover 4 such that the IC chip 2 and the antenna 3 are surrounded by the pressure-sensitive adhesive 5. The cover 4 and the pressure-sensitive adhesive 5 are not essential and may be omitted.

EXAMPLES

Examples of the present invention will be described below. However, the present invention is not limited to the following examples.

1. Preparation of Examples and Comparative Examples

IC tags according to Examples 1 to 5 and Comparative Examples 1 and 2 were prepared as follows. The IC tags of these examples and comparative examples used the same substrate and IC chip, but dipole antennas used therein were different from each other. Antennas of five types of shapes as shown in FIGS. 4 to 8 were prepared, and antennas of three types of materials were prepared. In FIGS. 4 to 8, the dotted line indicates the path L, and the numerical values indicate the lengths X and Y of the outer shape. As the substrate and a cover of each IC tag, polyethylene terephthalate films having a thickness of 50 μm were prepared. The dipole antenna was disposed between the substrate and the cover, and fixed using the above-described rubber-based pressure-sensitive adhesive. Then, the IC tags according to Examples 1 to 5 and Comparative Examples 1 and 2 were prepared as shown in Table 1 below. As described below, the antennas of the examples and the comparative examples were each made of a nonferrous metal.

TABLE 1

Figure 4:
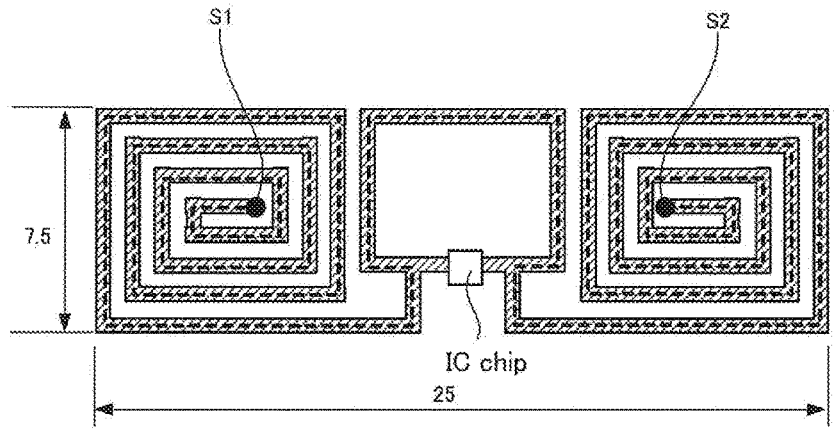
FIG. 4 is a plan view showing the shape of a dipole antenna used in Example 1 and Comparative Example 1.
Figure 5:
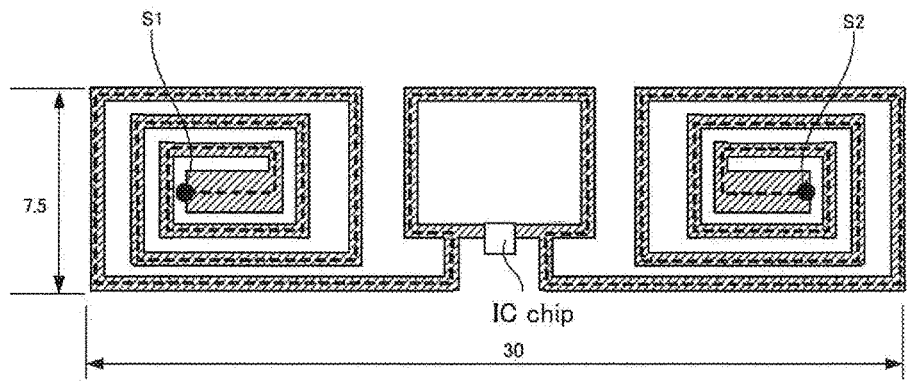
FIG. 5 is a plan view showing the shape of a dipole antenna used in Example 2.
Figure 6:
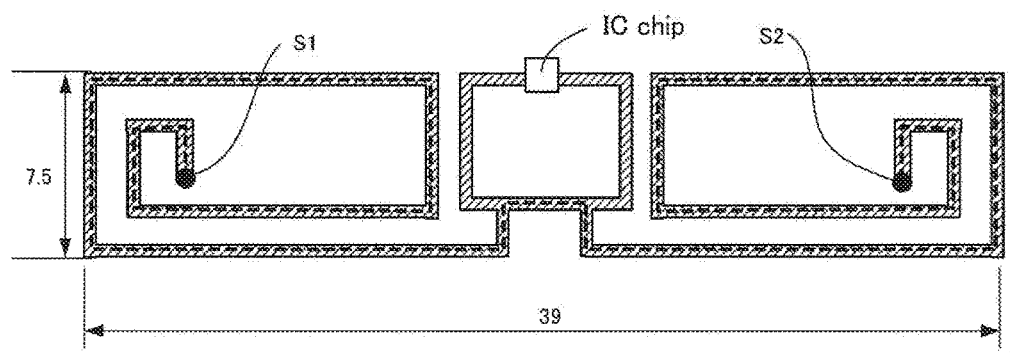
FIG. 6 is a plan view showing the shape of a dipole antenna used in Example 3 and Comparative Example 2.
Figure 7:
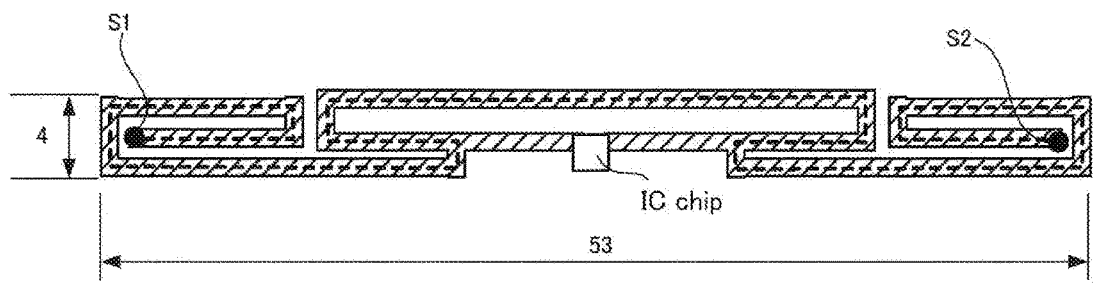
FIG. 7 is a plan view showing the shape of a dipole antenna used in Example 4.
Figure 8:
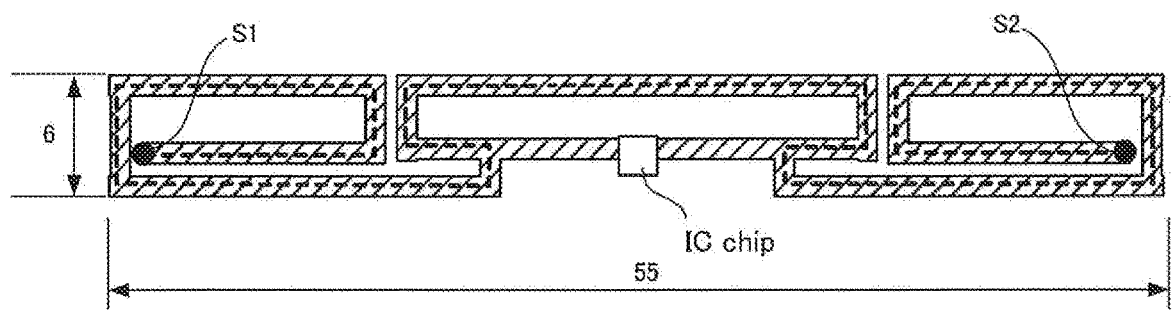
FIG. 8 is a plan view showing the shape of a dipole antenna used in Example 5.

| | Shape of antenna | Material of antenna | Thickness (mm) | Minimum width (mm) | Path Length L (cm) | Length $X^{(1)}$ (mm) | Length $Y^{(2)}$ (mm) | Area (mm$^2$) | Volume resistivity (Ω·m) | Resistance R at two ends (Ω) | R/L |
|---|---|---|---|---|---|---|---|---|---|---|---|
| Ex. 1 | FIG. 4 | Silver paste | 0.005 | 0.5 | 17.0 | 25 | 7.5 | 188 | $5.31 \times 10^{-7}$ | 36.1 | 2.12 |
| Ex. 2 | FIG. 5 | Silver paste | 0.005 | 0.5 | 17.4 | 30 | 7.5 | 255 | $5.95 \times 10^{-7}$ | 41.4 | 2.38 |
| Ex. 3 | FIG. 6 | Silver paste | 0.005 | 0.55 | 13.7 | 39 | 7.5 | 293 | $4.46 \times 10^{-7}$ | 22.2 | 1.62 |
| Ex. 4 | FIG. 7 | Silver paste | 0.015 | 0.72 | 14.1 | 53 | 4 | 212 | $1.53 \times 10^{-7}$ | 2 | 0.14 |
| Ex. 5 | FIG. 8 | Silver paste | 0.015 | 0.72 | 12.8 | 55 | 6 | 330 | $1.53 \times 10^{-7}$ | 1.8 | 0.14 |
| Comp. Ex. 1 | FIG. 4 | Aluminum | 0.01 | 0.5 | 17.0 | 25 | 7.5 | 188 | $2.65 \times 10^{-8}$ | 0.9 | 0.05 |
| Comp. Ex. 2 | FIG. 6 | Copper | 0.018 | 0.55 | 13.7 | 39 | 7.5 | 293 | $1.73 \times 10^{-8}$ | 0.24 | 0.018 |

$^{(1)}$Length X in lengthwise direction $^{(2)}$Length Y in widthwise direction

2. Evaluation

Using MUK-500 manufactured by NIKKA DENSOK LIMITED as a metal detector, whether the metal detector could detect the IC tags according to the above-described examples and comparative example was examined. The detection levels in this device are 0 to 12. Specifically, the detection levels are as follows. That is, when balls made of SUS304 are used, this device cannot detect a ball with a diameter of 1 mm but can detect a ball with a diameter of 2 mm or more. The detection level when the device detects a ball with a diameter of 2 mm is 8, and the detection level when the device detects a ball with a diameter of 3 mm is 12. On the other hand, a detection level of 0 means that this metal detector cannot detect a target substance at all. That is, the closer the detection level is to 0, the more difficult it becomes for the metal detector to detect a target substance.

TABLE 2

|  | Detection Level |
|---|---|
| Example 1 | 0 |
| Example 2 | 0 |
| Example 3 | 0 |
| Example 4 | 3 |
| Example 5 | 3 |
| Comparative Example 1 | 12 |
| Comparative Example 2 | 12 |

In Examples 1 to 3, the R/L values were 1.5 or more, and the detection levels were all 0. That is, the IC tags of Examples 1 to 3 were not detected by the metal detector at all. In Examples 4 and 5, the R/L values were 1 or less and lower than those in Examples 1 to 3, but were not less than 0.1. The levels of detection by the metal detector were 3. That is, although the IC tags of Examples 4 and 5 were slightly detectable, they were acceptable depending on the intended use thereof. On the other hand, in Comparative Examples 1 and 2, the R/L values were both lower than 0.1, and the detection levels were 12. That is, the IC tags of Comparative Examples 1 and 2 were at the detection level of certain detection by the metal detector. Thus, the evaluation based on the R/L values showed that the IC tags of Examples 1 to 5 are all superior to the IC tags of Comparative Examples 1 and 2.

LIST OF REFERENCE NUMERALS

1 Substrate
2 IC chip
3 Dipole antenna
4 Cover
5 Pressure-sensitive adhesive

The invention claimed is:

1. An IC tag comprising:
    an IC chip;
    a dipole antenna for electrically transmitting and receiving information stored in the IC chip, said dipole antenna being continuous at the IC chip; and
    a sheet-shaped substrate that supports the IC chip and the dipole antenna,
    wherein the dipole antenna includes:
        an impedance matching portion disposed at the IC chip location; and
        a pair of dipole portions extending from the impedance matching portion,
        wherein $0.1 \leq R/L(\Omega/cm) \leq 2.5$ is satisfied, where R is a resistance value between two ends of the dipole antenna and L is a length of a path that connects the two ends of the dipole antenna while extending along the dipole antenna without passing through the IC chip.

2. The IC tag according to claim 1, wherein the length L is not less than 120 mm and not more than 200 mm.

3. The IC tag according to claim 1, wherein a material of the dipole antenna contains any one of silver, aluminum, and copper.

4. The IC tag according to claim 1, further comprising:
    a sheet-shaped cover that covers the IC chip and the antenna, the IC chip and the antenna being disposed between the cover and the substrate; and
    a pressure-sensitive adhesive that bonds the cover and the substrate.

5. The IC tag according to claim 1, wherein the length L is not less than 120 mm and not more than 200 mm, and the resistance value R is 10 to 50Ω.

6. The IC tag according to claim 1, wherein the dipole antenna satisfies $1.5 \leq R/L(\Omega/cm) \leq 2.5$.

7. The IC tag according to claim 1, wherein the dipole antenna includes only two free ends respectively provided by the pair of the dipole portions, and the impedance matching portion is disposed between said two free ends.

* * * * *